United States Patent [19]

Stroo

[11] 4,260,094
[45] Apr. 7, 1981

[54] METHOD OF INTERCONNECTING SEVERAL PARTS, SUCH AS A PIECE OF TUBING AND A PLATE, A TUBE OR SIMILAR BODY

[75] Inventor: Christiaan A. Stroo, Mezenlaan, Netherlands

[73] Assignee: Technisch Handels-en Adviesbureau van Geffen B.V., Apeldoorn, Netherlands

[21] Appl. No.: 43,648

[22] Filed: May 30, 1979

[30] Foreign Application Priority Data

Jun. 6, 1978 [NL] Netherlands ............... 7806161

[51] Int. Cl.³ ............................................. B23K 19/02
[52] U.S. Cl. ....................................... 228/112; 228/2; 228/265
[58] Field of Search ................... 228/112, 113, 114, 2, 228/265

[56] References Cited

U.S. PATENT DOCUMENTS

| 2,776,473 | 1/1957 | Dailey et al. ............ 228/265 |
| 2,795,039 | 6/1957 | Hutchins ............... 228/114 |
| 3,647,553 | 3/1972 | Coffey ............... 228/112 X |

Primary Examiner—Richard B. Lazarus
Attorney, Agent, or Firm—John P. Snyder

[57] ABSTRACT

The method of using the frictional heat and pressure produced by a rapidly rotating non-cutting piercing tool to weld two or more parts, such as a piece of tubing on one hand and a plate, a tube or another body having locally a relatively thin wall on the other hand, together, to which end said piercing tool is forced through the two or more parts after the latter have been placed in the exact relative positions.

3 Claims, 4 Drawing Figures

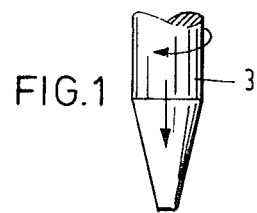
FIG.1
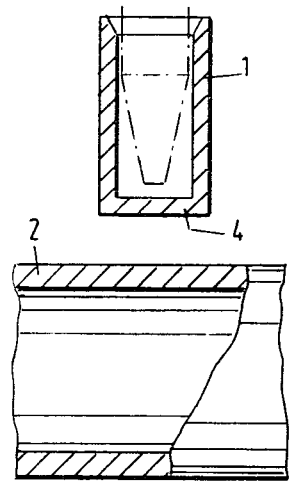
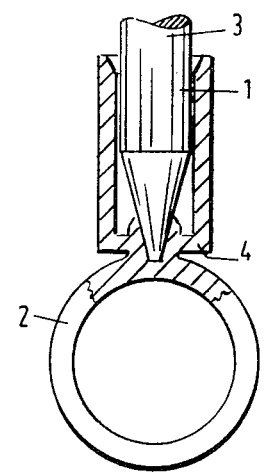
FIG.2
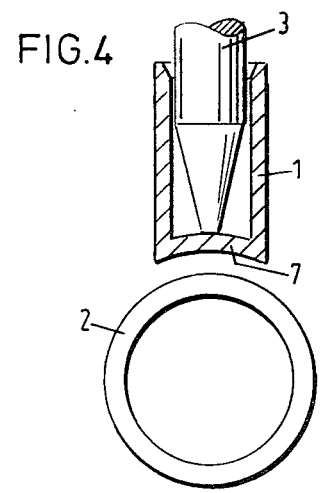
FIG.3
FIG.4

METHOD OF INTERCONNECTING SEVERAL PARTS, SUCH AS A PIECE OF TUBING AND A PLATE, A TUBE OR SIMILAR BODY

The invention relates to a method of interconnecting several parts, such as a piece of tubing and a plate, a tube or similar body.

Usually a piece of tubing is connected to a plate, a tube or other body in this way that first a hole is drilled or punched in the plate or the wall of the tube or other body, then a piece of tubing is forced into the hole with a press fit and thereupon the parts are interconnected by ordinary welding.

This known method has not only the disadvantage of requiring many manipulations and actions which make the connection in question expensive but it has also the disadvantage of causing variations in dimension such as variations in centre-to-centre distances, misalignment or oblique positions of the pieces of tubing, etc. These variations in dimension and other inaccuracies appear to be caused both by faults of the used machines and by human errors.

The invention has the object to avoid these disadvantages by providing a simple and inexpensive method which is characterized in that after the parts to be interconnected have been placed in the correct relative positions said parts are welded to one another by the frictional heat and pressure produced by a rapidly rotating non-cutting piercing tool which is forced through said parts.

In order to ensure that during the piercing process a sufficiently high temperature is produced to obtain a gas and liquid tight joint between the parts to be interconnected it is advantageous to use a piece of tubing which has been previously provided with a transverse wall or bottom at its end to be welded to the plate, the tube or similar body.

To guarantee the production of sufficient heat to weld together the parts to be interconnected a piercing tool may be used, of which the active portion has a maximum diameter which is slightly smaller than the diameter of the piece of tubing to be connected.

In order to give the joint or weld between the parts to be interconnected a favourable appearance a piece of tubing may be used, the outer surface of the transverse wall or bottom of which is shaped in conformance with the surface of the plate or the outer surface of the tube or similar body.

Still better results are obtained, when parts consisting of the same or similar materials are interconnected by welding process produced by the piercing tool.

The invention will be hereinafter further elucidated with the aid of the accompanying drawing. In the drawing:

FIG. 1 shows an exploded view of the parts to be interconnected and the tool to achieve a joint or weld according to the invention;

FIG. 2 a vertical sectional view of said parts and the tool shown in FIG. 1 during the welding process;

FIG. 3 a vertical sectional view of the produced joint or weld; and

FIG. 4 partly a side view, partly a sectional view of a slightly different set of parts to be interconnected.

In FIG. 1 a rapidly rotating downwards forced non-cutting piercing tool 3 is used to interconnect a piece of tubing 1 and a tube 2.

In order to ensure that in the region, where the weld is to be formed, a sufficiently high temperature is generated to cause the material to flow in the right way the piece of tubing 1 is provided with a bottom 4. Consequently, the downward moving piercing tool will first come into frictional contact with the bottom 4.

Owing thereto a hole with a diameter corresponding to the maximum diameter of the piercing tool will be made in said bottom and during the further downward movement also in the wall of the tube 2. During this movement of the piercing tool the material liquified by the heat generated by friction will flow partly upwards along the piercing tool into the piece of tubing 1, partly downwards along the said tool into the tube 2, as is shown at 5 and 6 in FIG. 3.

It is observed that the appearance of the joint or weld shown in FIG. 3 although it certainly is gas and liquid tight, is not very satisfactory due to the interconnection of a plane and a curved surface.

This problem can be solved by using a piece of tubing which has instead of a plane bottom a curved bottom 7 of which the curvature is adapted to the curvature of the tube 2 as is illustrated in FIG. 4.

It will be obvious that within the scope of the invention many modifications are possible.

What I claim is:

1. The method of making a branch pipe connection to a vessel such as a tube, which comprises the steps of:
   (a) providing a branch pipe blank having a side wall defining a bore and a transverse bottom wall at one end;
   (b) positioning said blank such that its bottom wall engages a wall of the vessel;
   (c) inserting a rapidly rotating, non-cutting piercing tool axially into said blank and penetrating said bottom wall and said wall of the vessel therewith to pierce said bottom wall and said wall of the vessel while welding the blank to the vessel.

2. The method as defined in claim 1 wherein said tool is of smaller diameter than said bore whereby part of the metal of said bottom wall is welded to the inner surface of the bore.

3. The method as defined in claim 1 or 2 wherein said bottom wall is arcuate to conform with said wall of the vessel.

* * * * *